United States Patent [19]
Singh

[11] 3,714,596
[45] Jan. 30, 1973

[54] METHODS AND APPARATUS FOR FM DEMODULATION USING NON-LINEAR AMPLIFYING AND/OR FEEDBACK PATHS

[75] Inventor: Digjit Singh, Waltham, Mass.

[73] Assignee: Bell & Howell Company, Chicago, Ill.

[22] Filed: Jan. 11, 1971

[21] Appl. No.: 105,371

[52] U.S. Cl. ..................329/192, 307/233, 329/103, 329/171, 330/28, 330/31
[51] Int. Cl. ..............................................H03d 1/06
[58] Field of Search......329/103, 192, 132, 169–175; 307/233; 330/28, 21, 31, 94; 325/347

[56] References Cited

UNITED STATES PATENTS

| | | | |
|---|---|---|---|
| 3,593,171 | 7/1971 | Gassmann | 307/233 |
| 3,193,774 | 7/1965 | Clapper | 307/233 X |
| 2,372,419 | 3/1945 | Ford et al. | 330/94 |
| 3,174,111 | 3/1965 | Grover | 330/31 X |
| 3,517,267 | 6/1970 | Ferrieu | 330/28 X |

*Primary Examiner*—Alfred L. Brody
*Attorney*—Rosen & Steinhilper

[57] ABSTRACT

This disclosure depicts systems and methods especially for demodulating a narrow band of frequency-modulated signals. In one embodiment a closed-loop amplification system has a negative feedback circuit comprising a highly frequency-selective RC filter network. Another embodiment discloses the use of combined positive and negative feedback having a net negative effect. Each system includes at least one non-linear component to cause the system frequency response to have a substantially linear negative slope across the said band of frequencies.

15 Claims, 5 Drawing Figures

DIGJIT SINGH
INVENTOR

BY
ROSEN and STEINHILPER
ATTORNEYS

METHODS AND APPARATUS FOR FM DEMODULATION USING NON-LINEAR AMPLIFYING AND/OR FEEDBACK PATHS

BACKGROUND OF THE INVENTION

This application relates to FM receivers, and especially to means and methods for demodulating a narrow band of FM signals which are useful, for example, in the field of tone-coded FM paging receivers.

The most common FM demodulation systems involve the use of tuned circuits employing resonant capacitive and inductive elements. But the undesirable properties of inductors (thermal and mechanical instability, cost, bulk, etc.) seriously detract from the usefulness of such demodulation systems.

Systems using passive bridge-type RC networks have been proposed to avoid the use of resonant circuits (for example, see "Linear Frequency Discriminator," J. R. Tillman, Wireless Engineering, October 1946); however, this approach results in relatively low frequency-to-amplitude conversion efficiency when considered for narrow band signals. Also see "Frequency Discrimination by Inverse Feedback" by G. H. Fritzinger, *Proceeding of the Institute of Radio Engineers*, Vol. 26, No. 1 (January, 1938). This latter publication suggests the use of a positive RC filter network in an inverse feedback loop around an amplifier as a way of achieving frequency filtering without the need for inductors. No teaching is found in this publication of introducing a non-linear component in a negative feedback amplification system having a band stop RC filter for purposes of FM demodulation. In fact, Fritzinger is concerned neither with FM demodulation nor with non-linear systems.

OBJECTS OF THE INVENTION

It is an object of this invention to provide improved methods and apparatus for demodulating FM signals, and especially to provide narrow band FM demodulation systems and methods which have high efficiency, low distortion, and which obviate the need for inductive elements.

It is another object to provide demodulation systems which consume very little electrical power, and which are thus useful in battery-powered FM receivers and the like.

It is yet another object to provide FM demodulation systems which are stable in operation and relatively economical to manufacture.

Further objects and advantages of the invention will in part be obvious and will in part become apparent as the following description proceeds. The features of novelty which characterize the invention will be pointed out with particularly in the claims annexed to and forming a part of this specification.

BRIEF DESCRIPTION OF THE DRAWINGS

For a fuller understanding of the invention, reference may be had to the following detailed description taken in connection with the accompanying drawings wherein.

DESCRIPTION OF THE PREFERRED EMBODIMENTS

My demodulation principle is based on a recognition that an amplifier with a tuned LC load circuit will not produce the normal gaussian frequency response characteristic if one of the reactive elements in the tuned circuit is non-linear, but rather will have an asymmetrical sawtooth-shaped response characteristic. Capitalizing on this highly predictable but generally deleterious phenomenon, and utilizing a novel closed-loop frequency-selective amplification system, I have developed an FM demodulator with favorable properties not present in prior art FM demodulation systems. Feedback through a highly frequency-selective passive filter network (or combination of networks) having a net negative effect is used to establish a stable, highly frequency dependent characteristic without the need for inductive elements. By introducing a non-linearity in the system, which may be at any point in the loop, the frequency response characteristic of the system takes a sawtooth shape having a steep positive slope below the demodulated band of frequencies and a less steep, substantially linear negative slope across the band of frequencies. I have discovered that the sawtooth characteristic described provides very good linearity over the selected band of frequencies.

The demodulation principle described is particularly suited to use with low current amplifiers. One preferred embodiment, described below, develops the desired non-linearity by causing a normally linear low current amplifier to be operated in a non-linear low current region of the amplifier's operating characteristic, a very advantageous feature for reasons of power economy in applications such as tone-coded paging receivers wherein battery life is of considerable importance.

Figures 1, 3:
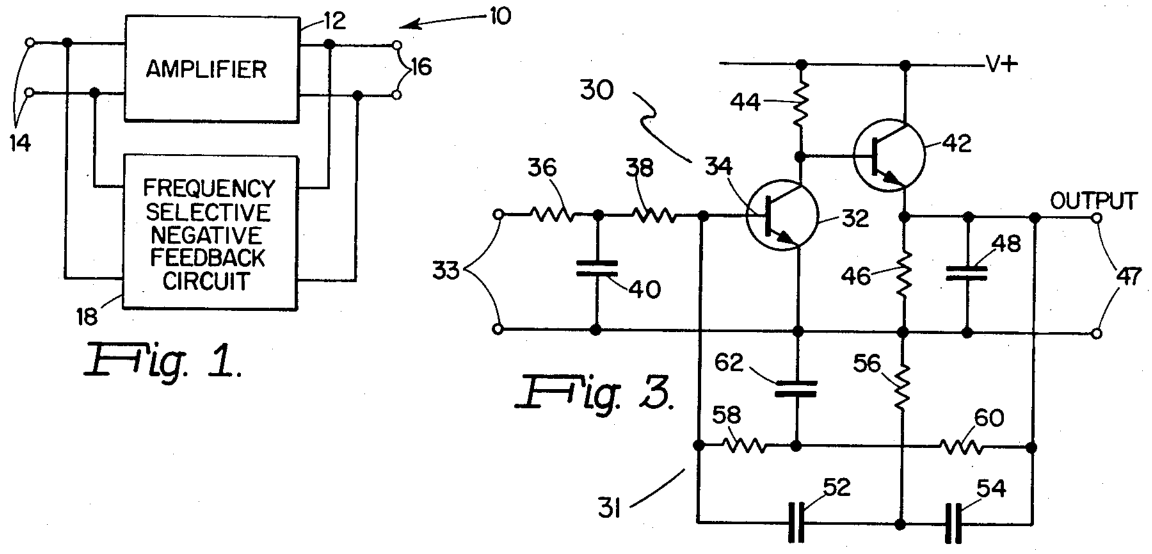
FIG. 1 is a block diagram of an FM demodulation system according to this invention.
FIG. 3 is a schematic diagram of a narrow band FM demodulation system according to this invention.

FIG. 1 is a block diagram of a closed-loop amplification system 10 which is useful in understanding the principles of this invention. The system 10 has an amplifier 12 with input terminals 14 and output terminals 16 (also shown as representing the system input and output terminals).

At least a portion of the output of the amplifier 12 is fed back in a degenerative sense through a feedback circuit 18. The feedback circuit 18 includes a highly frequency-selective passive filter network constructed and arranged to preferentially attenuate signals in the band of frequencies to be demodulated.

Figure 2:
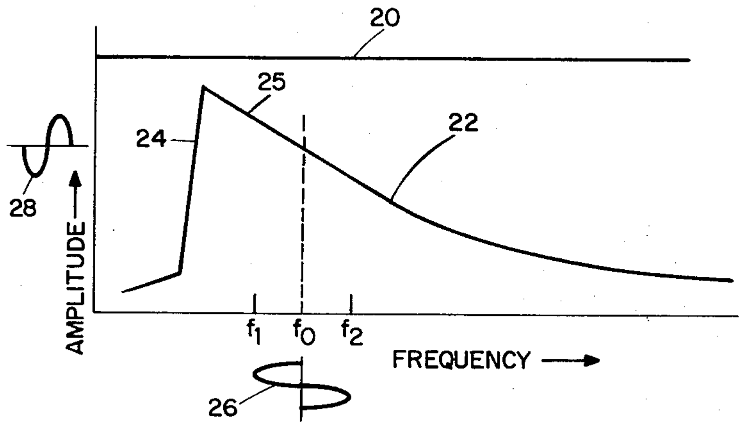
FIG. 2 is a graph depicting the input and output frequency response characteristic of systems implementing the principles of this invention.

In accordance with this invention, the system 10 includes at least one non-linear component such that the frequency response of the system generally takes the sawtooth form described above. The frequency response characteristic of the input signal may be, for purposes of this discussion, assumed to be flat, as depicted by curve 20 in FIG. 2. The frequency response of the output of the system 10 is, according to this invention, of the form depicted by curve 22 in FIG. 2. In FIG. 2 the band of frequencies to be demodulated is illustrated as being centered on a center frequency $f_0$ and extending from frequency $f_1$ below the center frequency $f_0$ to $f_2$ above the center frequency $f_0$. The curve 22 is, as described, similar to the skewed curve of a tuned circuit having a non-linear reactive element, and invariably includes a steep positive slope 24 below the band of frequencies $f_2$–$f_1$ and a less steep, substantially linear negative slope 25 across the said band of frequencies. The output of the system, assuming an input signal 26 containing frequencies centered about $f_0$ and varying between $f_2$ and $f_1$, will produce an amplitude-modulated output signal 28 which is substantially linearly related to the input signal 26.

As suggested above, the non-linear component necessary to carry out this invention can be located at any point in the system 10, namely, in the amplifier 12 or in the feedback circuit 18. In a preferred implementation of the invention, the non-linearity is introduced by employing a normally linear, low current amplifier which is operated in a non-linear low current region below the normal operating range of the amplifier. By introducing a non-linearity in the system in this way, a number of advantages accrue which are especially significant in applications where low electrical power consumption is desirable, such as in battery-powered paging receivers.

Since the amplifier 12 is a necessary component of the receiver, introducing the non-linearity by changing the operating point thereof produces the desired effect without the addition of any further circuit components. For reasons of economy of manufacture, this method of producing the non-linearity is of obvious value. Secondly, operating the amplifier 12 at an abnormally low current level has the further advantage of minimizing battery drain.

FIG. 3 illustrates a demodulation system according to the invention including an amplifier 30 and a feedback circuit 31 for feeding at least a portion of the output of the amplifier 30 back to the input thereof. The illustrated amplifier 30 produces very satisfactory results in carrying out this invention, comprising a relatively simple two-stage cascaded transister amplifier. The first stage includes a grounded emitter transistor 32. An input signal applied across input terminals 33 is passed through a T-type low pass filter network to the base electrode 34 of transistor 32. The filter network comprises series resistors 36, 38 and a shunting capacitor 40. The filter network filters out higher harmonics accompanying the band of signals to be demodulated.

Biasing for the transistor 32 is provided through the feedback circuit 31, described in detail below. Transistor 32 is direct coupled to a second amplifier stage comprising a transistor 42 connected in an emitter-follower arrangement. Bias resistor 44 determines the operating point of the amplifier. The output of transistor 42 is developed across a load resistor 46 and appears at output terminals 47. A capacitor 48 is connected in parallel across the load resistor 46 to exaggerate the non-linear operation of the amplifier.

The feedback circuit 31 may take a variety of forms, but is here shown by way of example, as comprising a passive filter network of the twin-T type, comprising in one "T" capacitors 52, 54 and a resistor 56, and in the parallel "T" resistors 58, 60 and a capacitor 62. The center frequency $f_0$ of the system and the bandwidth of the system is predetermined by the selection of the values of the resistors and capacitors in the feedback circuit 31, by the gain of the amplifier 30, and by the amplitude of the received input signal.

For optimum performance of the FIG. 3 system it is desirable that the input impedance be much larger than the output impedance thereof. I have found that very satisfactory performance is obtained if the input impedance is at least five times the output impedance of the system. The input impedance of an amplification system as shown in FIG. 3 is typically greater than 100 KΩ and the output impedance is typically less than 10 KΩ, thus satisfying the above-stated input-output impedance requirements.

Figures 4, 5:
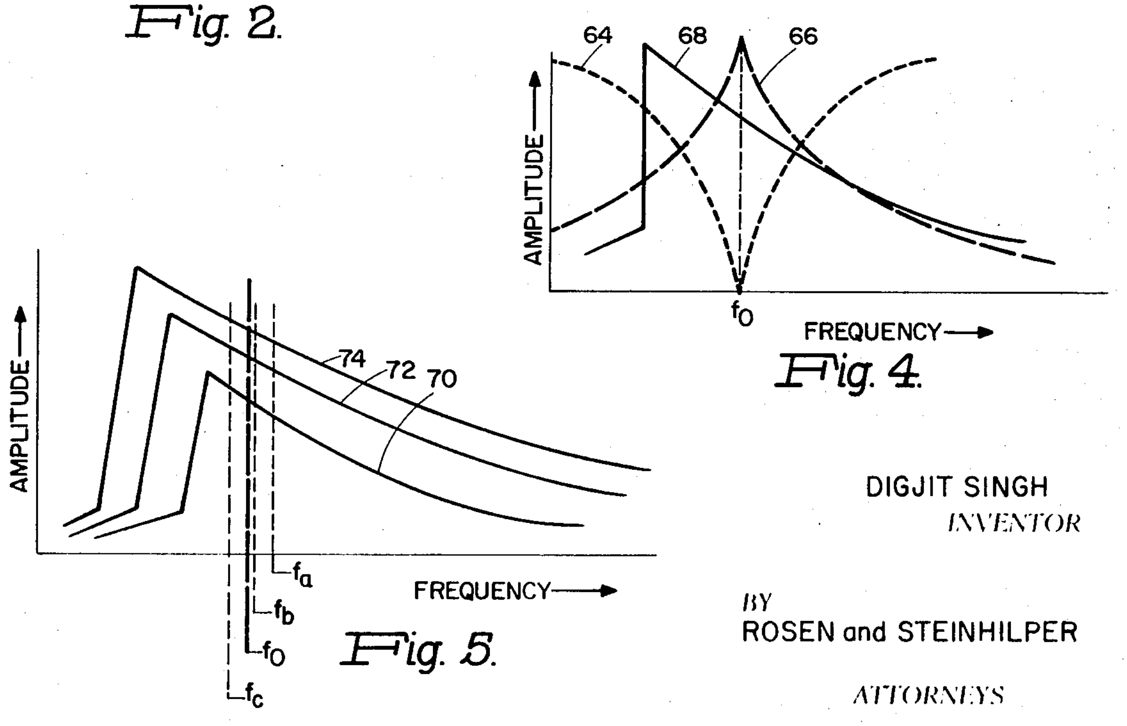
FIG. 4 is a graphical representation of certain characteristics of the FIG. 3 system which are useful in understanding the invention and the operation of the FIG. 3 system.
FIG. 5 depicts a family of curves which illustrate the amplitude-frequency characteristics of the FIG. 3 system for different input signal levels.

FIG. 4 illustrates a number of amplitude vs. frequency characteristics which may be useful in understanding the operation of the FIG. 3 system and the principles of this invention. In FIG. 4 curve 64 depicts the response characteristic of the twin-T filter network alone. Curve 66 represents very schematically what the frequency response characteristic of the FIG. 3 system might be if the amplifier 30 were operated in its normal linear operating range. Finally, curve 68 represents the sawtooth-shaped characteristic which is produced according to this invention by operating the amplifier 30 in a low current non-linear region of its operating characteristic.

I have obtained extremely satisfactory performance using a system as shown in FIG. 3 having components with the following values: resistors 36, 38—39 KΩ; capacitor 40—470 picofarads; resistor 44—220 KΩ; resistor 46—47 KΩ; capacitor 48—47 picofarads; capacitors 52, 54—90 picofarads; resistor 56—13.5 KΩ; resistors 58, 60—27 KΩ; capacitor 62—180 picofarads; and $V^+$—4 volts. With the component values enumerated the operating point of the system is at approximately 20 μa which is below the normal operating range for such an amplifier. At this operating point the amplifier operates non-linearly.

It was mentioned briefly above the amplitude vs. frequency characteristic of a system as shown at FIG. 3 is influenced by the amplitude level of the input signal. FIG. 5 illustrates very schematically and with some exaggeration the effect of changing input signal level on the output frequency response characteristic of such a system. In FIG. 5 curve 70 depicts the frequency response characteristic of the FIG. 3 system as it might appear for a very low input signal amplitude. For this (low signal level) characteristic the optimum demodulation center frequency might appear at the frequency $f_a$. Curves 72 and 74 represent frequency response characteristics of the system for normal and greater-than-normal input signal levels. The optimum demodulation frequencies for curves 72 and 74 might be at frequencies $f_b$ and $f_c$. In order that a system such as shown at FIG. 3 might perform satisfactorily for all input signal levels above a minimum acceptable level, the system is set for optimum response at a mean frequency $f_0$ which, as can be seen from FIG. 5, represents a compromise frequency. The system is, of course, designed with the knowledge that $f_0$ will coincide with the center frequency $f_c$ of the band of signals which that system is designed to demodulate. In paging receivers, center frequency $f_c$ is known as the "call" frequency.

The invention is not limited to the particular details of construction of the embodiments depicted, and it is contemplated that various and other modifications and applications will occur to those skilled in the art. For example, it has been stated above that the required non-linearity in systems constructed according to this invention can be established at any point in the closed loop of the system. The FIG. 3 system represents an embodiment wherein the non-linearity is established by operating a normally linear amplifier in an abnormally low current, non-linear region of the amplifier's operating characteristic. Alternatively, the same amplifier might be operated in a high current, non-linear region of its characteristic. Other amplification systems might be employed which have the property that gain is a strong function of the input signal level—for example, a square law amplifier or a logarithmic amplifier might be employed to introduce the necessary non-linearity in the system.

The non-linearity might be established in the feedback circuit, for example by introducing in the frequency-selective passive filter network a non-linear circuit element such as a non-linear capacitor or resistor. The use of a linear amplifier and a feedback circuit with a non-linear capacitor in the frequency-selective filter network would have the advantage over the FIG. 3 system of having larger dynamic range. The frequency-selective filter network, rather than being a twin-T type filter, as shown, may be a bridge-type filter such as a Wein bridge, bridge-T, or may be any other suitable passive RC frequency-selective filter circuit.

It is contemplated that rather than using a single negative feedback loop, as shown in the FIG. 3 system, there may be employed combined positive and negative feedback circuits within or around the amplifier which are caused to have a net negative effect. The required system non-linear component, might, for example be a varactor in the positive feedback circuit.

Therefore, because certain changes may be made in the above-described process without departing from the true spirit and scope of the invention herein involved, it is intended that the subject matter of the above depiction shall be interpreted as illustrative and not in a limiting sense.

What is claimed is:

1. A closed-loop system for demodulating a band of frequency-modulated signals centered about a center frequency $f_0$, comprising:

an amplifier having input and output terminals;

means for feeding said signals to said input terminals of said amplifier;

a frequency-selective RC feedback circuit that is constructed and arranged to preferentially attenuate signals in said band of frequencies;

means for feeding at least a portion of the output of said amplifier through said feedback circuit in a degenerative sense to said input terminals of said amplifier to establish a closed-loop system, said system being constructed to preferentially amplify signals in said band of frequencies;

at least one of said amplifier and said feedback circuit of said system including at least one non-linear component such that the frequency response of said system takes the approximate form of a sawtooth having a slope that is positive-going with increasing frequency below said band of frequencies and less steep, substantially linear but negative-going with increasing frequency across said band of frequencies, whereby said output of said amplifier is an amplitude modulated signal substantially linearly related to said frequency-modulated input signals.

2. The system defined by claim 1 wherein said amplifier constitutes said non-linear component.

3. A closed-loop system for demodulating a band of frequency-modulated signals centered about a center frequency $f_0$, comprising:

a normally linear amplifier having input and output terminals and including means for biasing said amplifier such as to cause it to operate non-linearly;

a frequency-selective RC feedback circuit that is constructed and arranged to preferentially attenuate signals in said band of frequencies; and means for feeding back at least a portion of the output of said amplifier through said feedback circuit in a degenerative sense to said input terminals of said amplifier to establish a closed-loop system, said system being constructed to preferentially amplify signals in said band of frequencies;

whereby the frequency response of said system takes the approximate form of a sawtooth having a slope that is positive-going with increasing frequency below said band of frequencies and less steep, substantially linear but negative-going with increasing frequency across said band of frequencies, and said output of said amplifier is an amplitude modulated signal substantially linearly related to said frequency-modulated input signals.

4. The system defined by claim 3 wherein said biasing means are selected to produce a low current operating point for the amplifier below its normal operating range.

5. The system defined by claim 4 wherein said feedback circuit includes an RC twin-T filter network.

6. The system defined by claim 4 wherein said amplifier has an input impedance which is at least about five times its output impedance.

7. The system defined by claim 5 wherein said amplifier has an input impedance which is at least about five times its output impedance.

8. The system defined by claim 4 wherein said feedback circuit includes a bridge-T filter network.

9. The system defined by claim 2 wherein said amplifier is a square law amplifier.

10. The system defined by claim 2 wherein said amplifier is a logarithmic amplifier.

11. The system defined by claim 1 wherein said feedback circuit constitutes said non-linear component.

12. The system defined by claim 11 wherein said feedback circuit includes an RC twin-T filter network having at least one non-linear circuit element.

13. The system defined by claim 12 wherein said non-linear circuit element is a non-linear capacitor.

14. A method for demodulating a band of frequency-modulated signals centered about a center frequency $f_0$ comprising the steps of:

amplifying the signals;

degeneratively feeding back a portion of the amplified signals through a frequency-selective filter that is constructed and arranged to preferentially attenuate signals in said band of frequencies;

performing at least one of the amplifying and feedback steps non-linearly whereby to provide a net amplification response curve which has a non-gaussian shape characterized by a slope that is positive going with increasing frequency below said band of frequencies and by a less steep substantially linear slope that is negative-going with increasing frequency across said band of frequencies.

15. A method for demodulating a band of frequency-modulated signals centered about a center frequency $f_0$ in a fashion which reduces power required comprising the steps of:

amplifying the signals in an amplifier which when operated at the design power level has a substantially gaussian frequency response characteristic;

reducing the operating current for said amplifier below said design level to a level at which the amplifier operates non-linearly; and degeneratively feeding back a portion of the amplified signals through a frequency-selective filter that is constructed and arranged to preferentially attenuate signals in said band of frequencies, and adjusting said operating current to provide a net amplification response curve which has a non-gaussian shape characterized by a slope that is positive-going with increasing frequency below said band of frequencies and by a less steep substantially linear slope that is negative-going with increasing frequency across said band of frequencies.

* * * * *